(12) United States Patent
Tao

(10) Patent No.: US 8,848,204 B2
(45) Date of Patent: Sep. 30, 2014

(54) IMAGE FORMING APPARATUS THAT PRINTS AN IMAGE ON A RECORDING MEDIUM SET FOR MANUAL FEED

(71) Applicant: Kozo Tao, Osaka (JP)

(72) Inventor: Kozo Tao, Osaka (JP)

(73) Assignee: KYOCERA Document Solutions Inc. (JP)

( * ) Notice: Subject to any disclaimer, the term of this patent is extended or adjusted under 35 U.S.C. 154(b) by 70 days.

(21) Appl. No.: 13/708,478

(22) Filed: Dec. 7, 2012

(65) Prior Publication Data

US 2013/0148144 A1  Jun. 13, 2013

(30) Foreign Application Priority Data

Dec. 9, 2011 (JP) .................................. 2011-270625
Dec. 9, 2011 (JP) .................................. 2011-270626
Dec. 7, 2012 (EP) .................................... 12196150

(51) Int. Cl.
| | |
|---|---|
| *G06K 15/00* | (2006.01) |
| *B41J 11/00* | (2006.01) |
| *G06K 15/16* | (2006.01) |
| *H04N 1/23* | (2006.01) |
| *H04N 1/00* | (2006.01) |
| *G06K 15/02* | (2006.01) |
| *B41J 11/48* | (2006.01) |
| *B41J 13/00* | (2006.01) |
| *H04N 1/04* | (2006.01) |

(52) U.S. Cl.
CPC .............. *G06K 15/16* (2013.01); *B41J 11/0095* (2013.01); *H04N 1/2353* (2013.01); *B41J 11/008* (2013.01); *H04N 1/00694* (2013.01); *H04N 1/00631* (2013.01); *H04N 1/00623* (2013.01); *H04N 1/00721* (2013.01); *H04N 1/00822* (2013.01); *H04N 1/00689* (2013.01); *G06K 15/186* (2013.01); *B41J 11/485* (2013.01); *H04N 2201/0091* (2013.01); *H04N 1/00809* (2013.01); *B41J 13/0018* (2013.01); *H04N 1/2323* (2013.01); *H04N 1/00779* (2013.01)
USPC .......................................... 358/1.12; 358/498

(58) Field of Classification Search
USPC .............. 358/1.1, 1.2, 1.4, 1.5, 1.6, 1.9, 1.11, 358/1.12, 1.13, 1.14, 1.15, 1.16, 1.17, 1.18, 358/498
See application file for complete search history.

(56) References Cited

U.S. PATENT DOCUMENTS

| | | | |
|---|---|---|---|
| 6,278,524 B1 * | 8/2001 | Kujirai et al. ................ | 358/1.11 |
| 2002/0051161 A1 | 5/2002 | Kanazawa et al. | |
| 2006/0092450 A1 | 5/2006 | Kanazawa et al. | |

FOREIGN PATENT DOCUMENTS

| | | |
|---|---|---|
| JP | 06-166445 A | 6/1994 |
| JP | 07-267436 A | 10/1995 |

(Continued)

OTHER PUBLICATIONS

European Search Report for App. No. EP 12196150.2, mailed Jul. 22, 2013.

*Primary Examiner* — Thierry L Pham
(74) *Attorney, Agent, or Firm* — McDonnell Boehnen Hulbert & Berghoff LLP

(57) ABSTRACT

An image forming apparatus includes: a manual feed detecting unit that detects if a recording medium is set in a manual medium feeding unit; a print data receiving unit that receives print data; a medium orientation setting unit that receives an instruction for an orientation of the recording medium to be fed from the manual medium feeding unit, and sets the orientation; a printing control unit that controls the printing device to print an image based on the print data and executes a manual feed forcing operation if the manual feed detecting unit has detected the recording medium; and an image generating unit that generates the image based on the print data and determines an orientation of the image based on the orientation of the recording medium.

21 Claims, 18 Drawing Sheets

(56) References Cited

FOREIGN PATENT DOCUMENTS

| JP | 2000-190591 | 7/2000 |
| JP | 2001-175447 A | 6/2001 |
| JP | 2001-235976 | 8/2001 |
| JP | 2007-331125 | 12/2007 |
| JP | 2009-226665 | 10/2009 |

* cited by examiner

44

| FEED SOURCE | TYPE | SIZE |
| --- | --- | --- |
| CASSETTE 1 | PLAIN PAPER | A4 |
| CASSETTE 2 | FINE PAPER | A5 |
| CASSETTE 3 | CARDBOARD | B5 |
| ⋮ | ⋮ | ⋮ |
| MP TRAY | PLAIN PAPER | B3 |

FIG. 4

| FEED SOURCE | ORIENTATION |
|---|---|
| CASSETTE 1 | LANDSCAPE |
| CASSETTE 2 | PORTRAIT |
| CASSETTE 3 | PORTRAIT |
| ⋮ | ⋮ |
| MP TRAY | LANDSCAPE |

FIG. 5

IMAGE FORMING APPARATUS THAT PRINTS AN IMAGE ON A RECORDING MEDIUM SET FOR MANUAL FEED

REFERENCE TO RELATED APPLICATIONS

This application is based upon and claims the benefit of priority from the corresponding Japanese Patent Application Nos. 2011-270625, filed in the Japan Patent Office on Dec. 9, 2011, and 2011-270626, filed in the Japan Patent Office on Dec. 9, 2011, the entire contents of which are incorporated herein by reference.

BACKGROUND

1. Technical Field

The present disclosure relates to an image forming apparatus capable of printing an image on a recording medium set for manual feed. Unless otherwise indicated herein, the description in this section is not prior art to the claims in this application and is not admitted to be prior art by inclusion in this section.

2. Description of the Related Art

A typical image forming apparatus may include a paper cassette that stores paper as a recording medium, a paper tray on which the paper is set for manual feed, and a printing device that prints an image on the paper fed from either the paper cassette or the paper tray. When generating an image to be printed based on print data, an image forming apparatus may determine an orientation of the image based on an orientation of the paper received from a personal computer (PC). Therefore, the typical image forming apparatus may adjust the orientation of the image to be printed in accordance with the orientation of the paper even if the orientation of the paper set on the paper tray differs from page to page.

Further, another image forming apparatus may include a paper detector that detects if paper is set on the paper tray. Other image forming apparatuses may force the paper to be fed from the paper tray to the printing device when the paper detector detects that the paper is set on the paper tray.

Even if an image forming apparatus is configured to feed the paper from the paper tray to the printing device, a user needs to manually designate the orientation of the paper. In some instances, this manual designation may be required every time he/she transmits the print data.

SUMMARY

An image forming apparatus according to an exemplary embodiment of the present disclosure includes a medium storage unit, a manual medium feeding unit, a manual feed detecting unit, a printing device, a print data receiving unit, a medium orientation setting unit, a printing control unit, and an image generating unit. The medium storage unit is configured to store a recording medium. The manual medium feeding unit is configured to have the recording medium set for manual feed. The manual feed detecting unit is configured to detect if the recording medium is set in the manual medium feeding unit. The printing device is configured to print an image on the recording medium fed from either the medium storage unit or the manual medium feeding unit. The print data receiving unit is configured to receive print data. The medium orientation setting unit is configured to: (1) receive a first instruction for an orientation of the recording medium to be fed from the manual medium feeding unit to the printing device, and based at least on the first instruction, (2) set the orientation of the recording medium. The printing control unit is configured to: control the printing device to print the image based on the print data on the recording medium; and execute a manual feed forcing operation that forces the recording medium to be fed from the manual medium feeding unit to the printing device if the manual feed detecting unit has detected that the recording medium is set in the manual medium feeding unit. The image generating unit is configured to: generate the image based on the print data; and determine an orientation of the image based on the orientation of the recording medium.

A non-transitory computer-readable recording medium according to an exemplary embodiment of the present disclosure has stored thereon an image forming program executed by a computer of an image forming apparatus. The image forming program includes five program codes. The first program code causes the computer to detect if a recording medium is set in a manual medium feeding unit, where the recording medium is set for manual feed. The second program code causes the computer to receive print data. The third program code causes the computer to: (1) receive a first instruction for an orientation of the recording medium to be fed from the manual medium feeding unit to a printing device, and based at least on the first instruction, (2) set the orientation of the recording medium. The fourth program code causes the computer to: based at least on the print data, control the printing device to print an image on the recording medium fed from either a medium storage unit that stores the recording medium or the manual medium feeding unit; and execute a manual feed forcing operation that forces the recording medium to be fed from the manual medium feeding unit to the printing device if a manual feed detecting unit has detected that the recording medium is set in the manual medium feeding unit. The fifth program code causes the computer to generate the image based on the print data and determine an orientation of the image based on the orientation of the recording medium.

An image forming apparatus according to another exemplary embodiment of the present disclosure includes a medium storage unit, a manual medium feeding unit, a manual feed detecting unit, a manual feed attribute setting unit, a printing device, a print data storage unit, a stored data printing instruction receiving unit, and a printing control unit. The medium storage unit is configured to store a recording medium. The manual medium feeding unit is configured to have the recording medium set for manual feed. The manual feed detecting unit is configured to detect if the recording medium is set in the manual medium feeding unit. The manual feed attribute setting unit is configured to: (1) receive a first instruction for a first attribute of the recording medium corresponding to the manual medium feeding unit and (2) set the first attribute. The printing device is configured to print an image on the recording medium fed from either the medium storage unit or the manual medium feeding unit. The print data storage unit is configured to store print data. The stored data printing instruction receiving unit is configured to receive a stored data printing instruction for printing based on the print data stored in the print data storage unit. The printing control unit is configured to control the printing device to print the image based on the print data on the recording medium. If the stored data printing instruction is received by the stored data printing instruction receiving unit and the manual feed detecting unit has detected that the recording medium is set in the manual medium feeding unit, the printing control unit is further configured to execute a manual feed forcing operation that forces the recording medium to be fed from the manual medium feeding unit to the printing device. The printing control unit is further configured to continue the printing while executing the manual feed forcing operation even if the first attribute of the recording medium does not match a second attribute of the recording medium included in the print.

A non-transitory computer-readable recording medium according to another exemplary embodiment of the present disclosure has stored thereon an image forming program executed by a computer of an image forming apparatus. The image forming program includes five program codes. The first program code causes the computer to detect if a recording medium is set in a manual medium feeding unit that has the recording medium set for manual feed. The second program code causes the computer to: (1) receive a first instruction for a first attribute of the recording medium corresponding to the manual medium feeding unit and (2) set the first attribute. The third program code causes the computer to store print data in a storage unit. The fourth program code causes the computer to receive a stored data printing instruction for printing based on the print data. The fifth program code causes the computer to control a printing device to print an image based on the print data on the recording medium fed from either a medium storage unit that stores the recording medium or the manual medium feeding unit. If the stored data printing instruction is received and the recording medium is set in the manual medium feeding unit, the computer is further configured to execute a manual feed forcing operation that forces the recording medium to be fed from the manual medium feeding unit to the printing device. The computer is further configured to continue the printing while executing the manual feed forcing operation even if the first attribute of the recording medium does not match a second attribute of the recording medium included in the print data.

Additional features and advantages are described herein, and will be apparent from the following Detailed Description and the figures.

BRIEF DESCRIPTION OF THE DRAWINGS

In the accompanying drawings:

FIG. 4 shows an example of contents of feed source attribute settings, according to an embodiment of the present disclosure;

FIG. 5 shows an example of contents of feed orientation settings, according to an embodiment of the present disclosure;

DETAILED DESCRIPTION

In the following, an embodiment of the present disclosure is described with reference to the accompanying drawings.

First, a description is made of a configuration of a network system according to the embodiment of the present disclosure.

Figure 1:
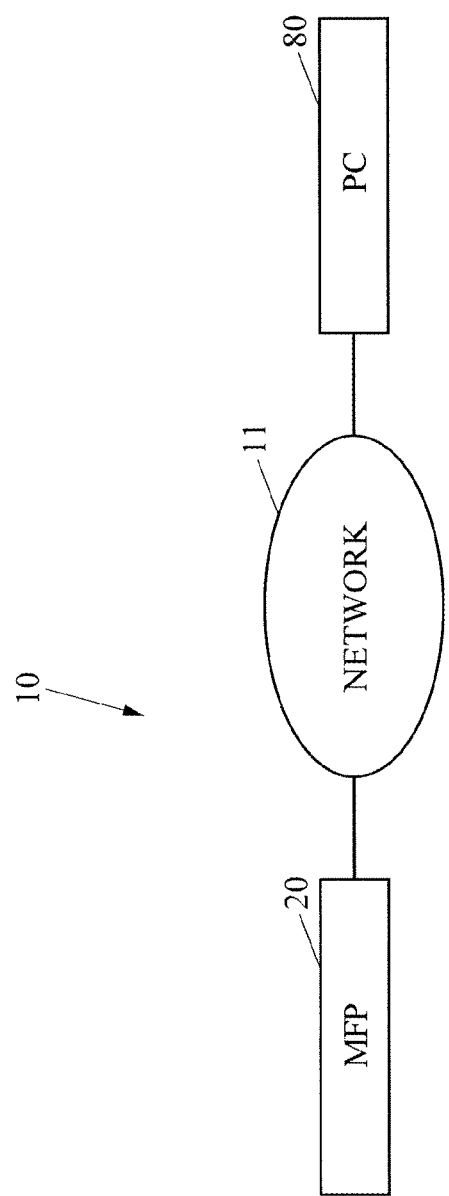
FIG. 1 shows a configuration of a network system, according to an embodiment of the present disclosure.

FIG. 1 shows a configuration of the network system, according to an embodiment of the present disclosure.

As illustrated in FIG. 1, network system 10 includes multifunction peripheral (MFP) 20 as an image forming apparatus, and personal computer (PC) 80 serving as an external device with respect to MFP 20. MFP 20 and PC 80 are communicably connected to each other via network 11 such as a local area network (LAN) or the Internet.

Figure 2:
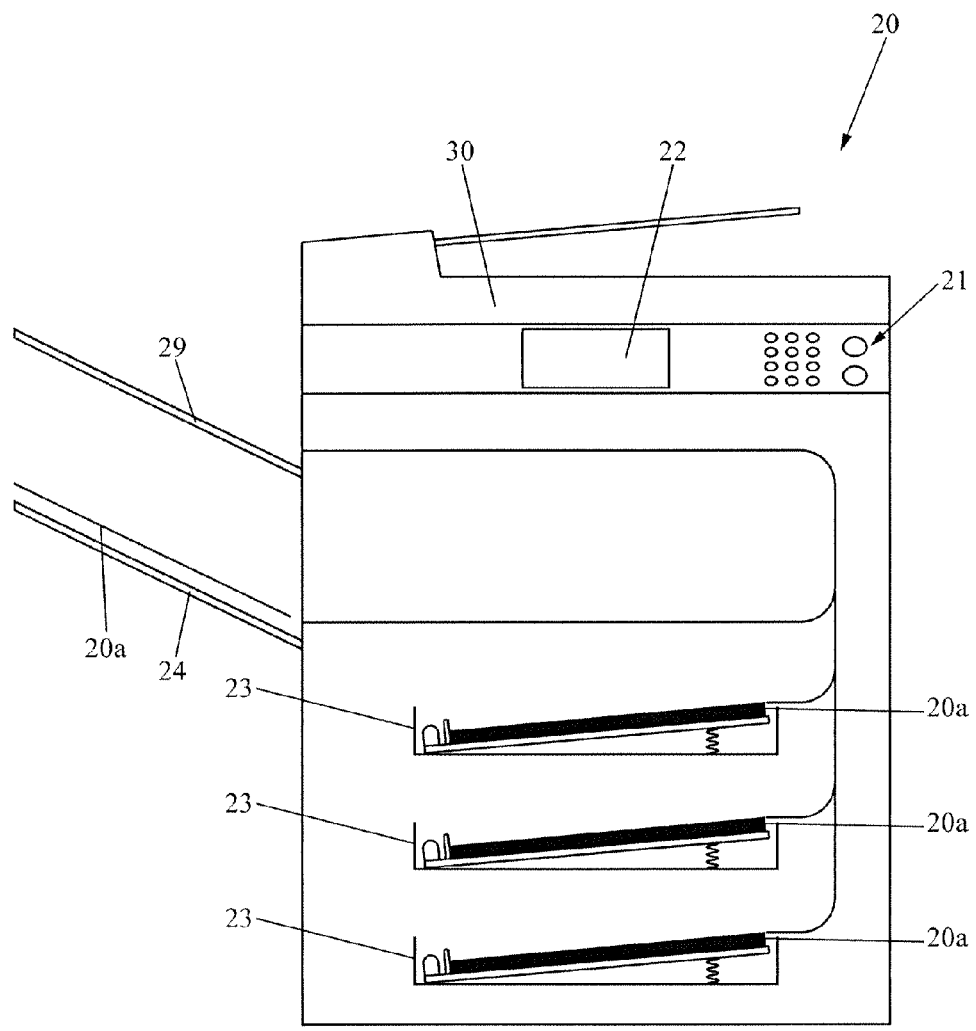
FIG. 2 shows a structure of an MFP, according to an embodiment of the present disclosure.
Figure 3:
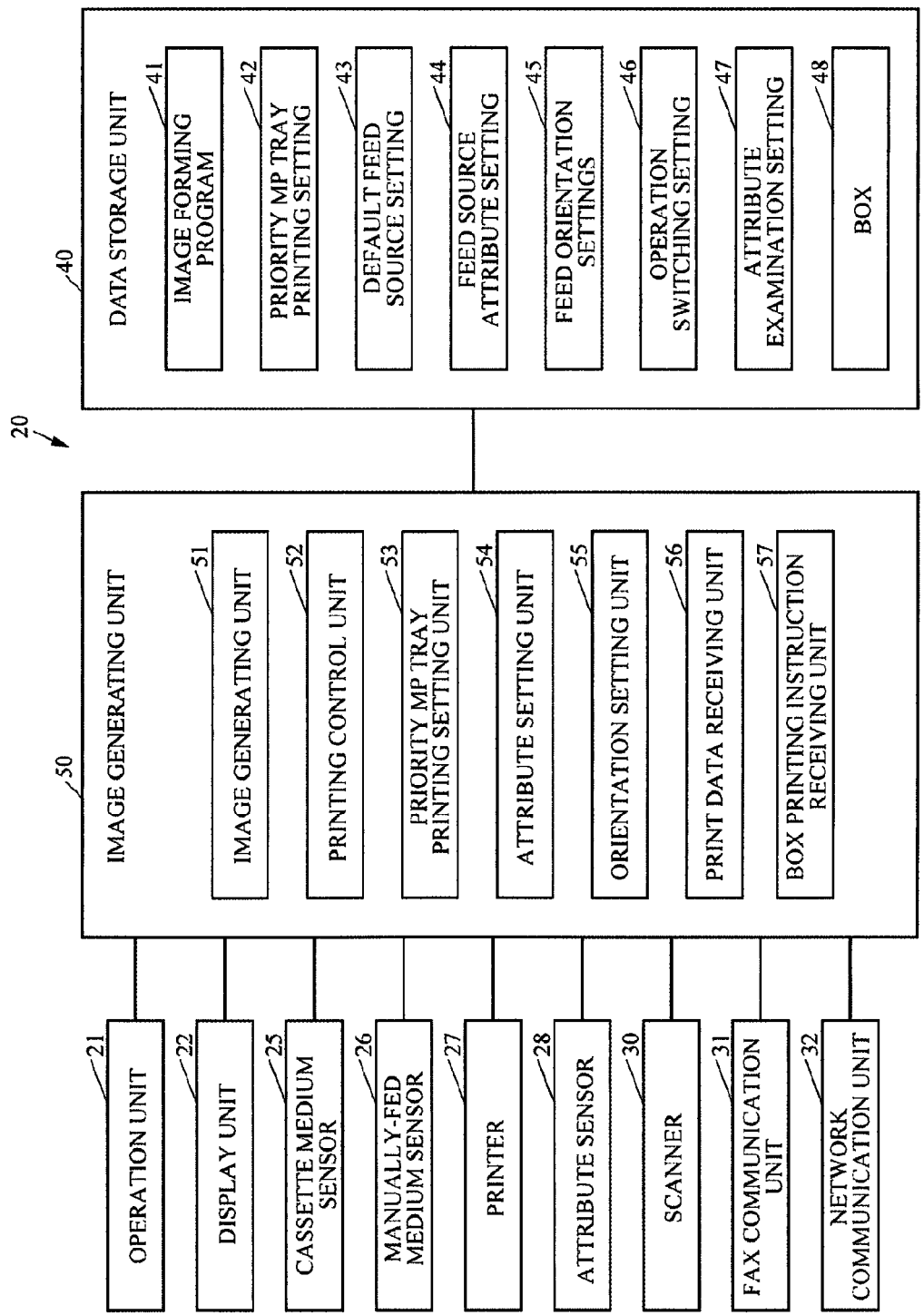
FIG. 3 shows functional blocks of the MFP, according to an embodiment of the present disclosure.

FIG. 2 shows a structure of MFP 20, according to an embodiment of the present disclosure. FIG. 3 shows functional blocks of MFP 20, according to an embodiment of the present disclosure.

As illustrated in FIG. 2 and FIG. 3, MFP 20 includes operation unit 21, display unit 22, plurality of sheet feeding cassettes 23, multi-purpose (MP) tray 24, plurality of cassette medium sensors 25, manually-fed medium sensor 26, printer 27, attribute sensor 28, delivery tray 29, scanner 30, FAX communication unit 31, network communication unit 32, data storage unit 40, and control unit 50.

Operation unit 21 is an input device, possibly with buttons through which a user inputs various operations. Display unit 22 may be a display device, such as a liquid crystal display (LCD) that displays various kinds of information. Sheet feeding cassette 23 is a medium storage unit that stores recording medium 20a, such as paper. MP tray 24 is a manual medium feeding unit on which recording medium 20a is set for manual feed. Cassette medium sensors 25 detect if recording medium 20a is set in each of the plurality of sheet feeding cassettes 23. Manually-fed medium sensor 26 is a manual feed detecting unit that detects if recording medium 20a is set on MP tray 24. Printer 27 is a printing device that prints an image on recording medium 20a, which may be fed from any one of the sheet feeding cassettes 23 and MP tray 24. Attribute sensor 28 is a medium attribute detecting unit that detects an attribute of recording medium 20a fed to printer 27. Delivery tray 29 is a delivery destination of recording medium 20a on which the image has been printed by printer 27. Scanner 30 is a reading device that reads an image from an original. FAX communication unit 31 is a FAX device that performs FAX communications via a communication line such as a public telephone line. Network communication unit 32 is a network communication device that performs communications via network 11. Data storage unit 40 is a storage device that stores various kinds of data, such as electrically erasable programmable read only memory (EEPROM) and a hard disk drive (HDD). Control unit 50 may control MFP 20 in its entirety.

The attribute of recording medium 20a may indicate the type of recording medium 20a such as plain paper, fine paper, thin paper, cardboard, the recycled paper, or an overhead projector (OHP) sheet and a size of recording medium 20a such as an A3 size, an A4 size, an A5 size, a B4 size, a B5 size, and/or a B6 size, among other possibilities.

Data storage unit 40 stores image forming program 41. Image forming program 41 may be installed on MFP 20 in a manufacturing stage of MFP 20. In some instances, image forming program 41 may be installed on MFP 20 from a storage medium such as a universal serial bus (USB) memory or an SD memory card. Yet in some instances, image forming program 41 may be installed on MFP 20 from network 11.

Data storage unit 40 stores a priority MP tray printing setting 42 relating to placing of a higher priority on MP tray 24 than sheet feeding cassette 23. Priority MP tray printing setting 42 is any one of "Setting 1," "Setting 2," and "Setting 3." "Setting 1" is a default setting. "Setting 2" is a setting for placing a higher priority on MP tray 24 than sheet feeding cassette 23 if manually-fed medium sensor 26 has detected that recording medium 20a is set on MP tray 24 and if a feed source of recording medium 20a is not designated as sheet feeding cassette 23. "Setting 3" is a setting for placing a higher priority on MP tray 24 than sheet feeding cassette 23 if manually-fed medium sensor 26 has detected that recording medium 20a is set on MP tray 24.

Data storage unit 40 stores default feed source setting 43 and feed source attribute settings 44. Default feed source setting 43 may include settings on a feed source of recording medium 20a that may be set as the default among the sheet feeding cassettes 23 and MP tray 24. Feed source attribute settings 44 may be settings on the attribute of recording medium 20a with regard to sheet feeding cassettes 23 and MP tray 24. The feed source set by default feed source setting 43 is hereinafter referred to as "default feed source."

FIG. 4 shows an example of contents of feed source attribute settings 44, according to an embodiment of the present disclosure.

As shown in FIG. 4, feed source attribute setting 44 may relate to information obtained by associating sheet feeding cassettes and an MP tray with types and sizes of recording medium. Note that, in feed source attribute settings 44 shown in FIG. 4, "Cassette 1," "Cassette 2," "Cassette 3," . . . represent a plurality of sheet feeding cassettes.

Attributes of the recording medium set in feed source attribute settings 44 are hereinafter referred to as "set attributes." Of the set attributes, the type of the recording medium is hereinafter referred to as "set type," and the size of the recording medium is hereinafter referred to as "set size." Further, the attributes of the recording medium included in print data are hereinafter referred to as "designated attributes." Of the designated attributes, the type of the recording medium is hereinafter referred to as "designated type," and the size of the recording medium is hereinafter referred to as "designated size." Further, the attributes of the recording medium detected by an attribute sensor are hereinafter referred to as "detected attributes." Of the detected attributes, the type of the recording medium is hereinafter referred to as "detected type," and the size of the recording medium is hereinafter referred to as "detected size." Further, the attributes of the recording medium used in control of a printer performed by a printing control unit described later are hereinafter referred to as "control attributes." Of the control attributes, the type of the recording medium is hereinafter referred to as "control type," and the size of the recording medium is hereinafter referred to as "control size."

As illustrated in FIG. 3, data storage unit 40 stores feed orientation settings 45 relating to an orientation of recording medium 20a to be fed to printer 27.

FIG. 5 shows an example of contents of feed orientation settings, according to an embodiment of the present disclosure. For example, FIG. 5 shows an example of contents of feed orientation settings 45.

As shown in FIG. 5, feed orientation settings 45 are information obtained by associating the sheet feeding cassettes and the MP tray with the orientations of the recording medium to be fed to the printer. The orientations of the recording medium include "landscape" in which the recording medium is fed to the printer in a direction extending along a short side of the recording medium and "portrait" in which the recording medium is fed to the printer in a direction extending along a long side of the recording medium. Note that, in feed orientation settings 45 shown in FIG. 5, "Cassette 1," "Cassette 2," "Cassette 3," and other cassettes (not shown) represent the plurality of sheet feeding cassettes.

The orientation of the recording medium that is set in feed orientation settings 45 is hereinafter referred to as "set orientation."

As illustrated in FIG. 3, data storage unit 40 stores operation switching setting 46 related to switching of an operation when determining the feed source of recording medium 20a. Operation switching setting 46 may be "automatic" in which the feed source is automatically determined by MFP 20 and "fixed" in which the feed source designated in the print data or the feed source selected via operation unit 21 (hereinafter referred to as "designated feed source") is employed.

Data storage unit 40 stores attribute examination setting 47 related to the execution of an examination (hereinafter referred to as "attribute examination") as to whether or not the designated attribute and the set attribute of the designated feed source match each other. Attribute examination setting 47 may either be "on," in which the attribute examination is executed, or "off" in which the attribute examination is not executed.

Data Storage unit 40 can store BOX 48 being an area that stores the print data and serving as a print data storage unit according to the present disclosure. Note that, BOX 48 can store a plurality of data, possibly related to print data.

Control unit 50 includes, for example, a central processing unit (CPU), a read only memory (ROM) that stores a program and various kinds of data, and a random access memory (RAM) used as a work area of the CPU. The CPU is configured to execute the program stored in the ROM or data storage unit 40.

Control unit 50 executes an image forming program to thereby operate as image generating unit 51, printing control unit 52, priority MP tray printing setting unit 53, attribute setting unit 54, orientation setting unit 55, print data receiving unit 56, and BOX printing instruction receiving unit 57. Image generating unit 51 executes image forming program 41 stored in data storage unit 40 to thereby generate an image based on the print data. Printing control unit 52 controls printer 27 to print the image based on the print data on recording medium 20a.

In some instances, priority MP tray printing setting unit 53 receives an instruction to change the priority MP tray printing setting 42, and changes priority MP tray printing setting 42. Priority MP tray printing setting unit 53 can adjust settings in response to the received instruction to change priority MP tray printing setting 42 to "Setting 2" or "Setting 3." As such, a priority manual feed setting unit may operate according to the present disclosure.

In some instances, attribute setting unit 54 receives an instruction for the attributes of recording medium 20*a* with regard to sheet feeding cassettes 23 and MP tray 24. In response to the instruction, attribute setting unit 54 can set the attribute. As such, a manual feed attribute setting unit may operate according to the present disclosure.

In some instances, orientation setting unit 55 may receive an instruction for the orientation of recording medium 20*a* to be fed to printer 27. In response to the instruction, orientation setting unit 55 can set the orientation of recording medium 20*a* fed from MP tray 24 to printer 27. As such, a medium orientation setting unit may operate according to the present disclosure.

Print data receiving unit 56 receives the print data. BOX printing instruction receiving unit 57 constitutes a stored data printing instruction receiving unit that receives an instruction for printing based on the print data stored in BOX 48, in other words, a stored data printing instruction.

Figure 6:
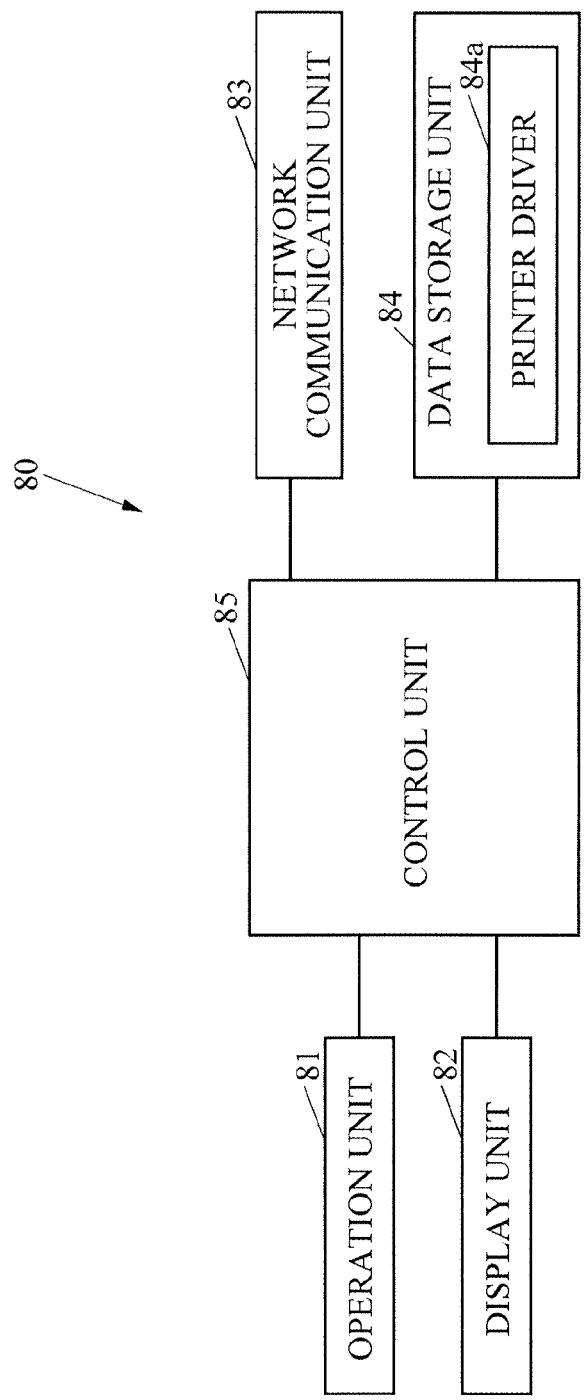
FIG. 6 shows functional blocks of a PC, according to the embodiment of the present disclosure.

FIG. 6 shows functional blocks of a PC, according to the embodiment of the present disclosure. As illustrated, FIG. 6 shows functional blocks of PC 80.

As illustrated in FIG. 6, PC 80 includes operation unit 81, display unit 82, network communication unit 83, data storage unit 84, and control unit 85. Operation unit 81 is an input device such as a mouse and a keyboard through which the user inputs varies operations. Display unit 82 is a display device such as an LCD that displays various kinds of information. Network communication unit 83 is a network communication device that performs communications via network 11. Data storage unit 84 is a storage device such as an HDD that stores various kinds of data. Control unit 85 controls an entirety of PC 80.

Data storage unit 84 stores printer driver 84*a* for controlling MFP 20. Printer driver 84*a* may be installed on PC 80 in a manufacturing stage of PC 80. In some instances, printer driver 84*a* may be installed on PC 80 from a storage medium such as the USB memory, a compact disc (CD), or a digital versatile disc (DVD), or from network 11.

Control unit 85 includes, for example, a CPU, a ROM that stores a program and various kinds of data. In some instances, control unit 85 may include a RAM used as a work area of the CPU. The CPU is configured to execute the program stored in the ROM or data storage unit 84.

In the next section, a description of the MFP and the PC in the network system is provided based on the configurations illustrated in FIGS. 3 and 6.

(Changing of Priority MP Tray Printing Setting 42)

A description is made of an operation performed by MFP 20 if priority MP tray printing setting 42 is changed.

When the user inputs an instruction to display a screen for changing priority MP tray printing setting 42 through operation unit 21, the priority MP tray printing setting unit 53 displays the screen on display unit 22. Through a graphical user interface (GUI) displayed on the screen, the user can issue an instruction to change priority MP tray printing setting 42 to any one of the above-mentioned settings, "Setting 1," "Setting 2," and "Setting 3."

When the user inputs the instruction to change priority MP tray printing setting 42, priority MP tray printing setting unit 53 receives the instruction input through operation unit 21 and changes priority MP tray printing setting 42 on data storage unit 40 in accordance with the received instruction.

The above description is directed to the changing of priority MP tray printing setting 42, performed through operation unit 21 and display unit 22. Priority MP tray printing setting 42 can also be changed through operation unit 81 and display unit 82 of PC 80 via network 11 by having a program for changing priority MP tray printing setting 42 installed into PC 80.

(Changing of Feed Source Attribute Settings 44)

The next description relates to an operation performed by MFP 20 if feed source attribute settings 44 are changed.

When the user inputs an instruction to display a screen for setting the feed source attribute settings 44 through operation unit 21, attribute setting unit 54 displays the screen on display unit 22. Through the GUI displayed on the screen, the user can issue an instruction to set the attributes of recording medium 20*a* with regard to sheet feeding cassettes 23 and MP tray 24.

When the user inputs the instruction to set the attributes of recording medium 20*a* with regard to sheet feeding cassette 23 and MP tray 24 through operation unit 21, attribute setting unit 54 receives the instruction input through operation unit 21 and sets feed source attribute settings 44 on data storage unit 40 in accordance with the received instruction.

The above description is directed to the changing of feed source attribute settings 44 that is performed through operation unit 21 and display unit 22. Feed source attribute settings 44 can also be changed through operation unit 81 and display unit 82 of PC 80 via network 11 by having a program for changing feed source attribute settings 44 installed into PC 80.

(Changing of Feed Orientation Settings 45)

The next description relates to the operation performed by MFP 20 if feed orientation settings 45 are changed.

When the user inputs an instruction to display a screen for performing setting of feed orientation settings 45 through operation unit 21, orientation setting unit 55 of control unit 50 displays the screen on display unit 22. Through the GUI displayed on the screen, the user can issue an instruction to set the orientation of recording medium 20*a* to be fed to printer 27.

When the user inputs the instruction to set the orientation of recording medium 20*a* to be fed to printer 27 through operation unit 21, orientation setting unit 55 receives the instruction input through operation unit 21 and sets feed orientation settings 45 on data storage unit 40 in accordance with the received instruction.

The above description is directed to the changing of feed orientation settings 45, performed through operation unit 21 and display unit 22. Feed orientation settings 45 can also be changed through operation unit 81 and display unit 82 of PC 80 via network 11 by having a program for changing the feed orientation settings 45 installed into PC 80.

(Changing of Operation Switching Setting 46)

The next description relates to the operation performed by MFP 20 if operation switching setting 46 is changed.

When the user inputs an instruction to display a screen for changing operation switching setting 46 through operation unit 21, control unit 50 displays the screen on display unit 22. Through the GUI displayed on the screen, the user can issue an instruction to change operation switching setting 46 to any one of the above-mentioned "automatic" and "fixed."

When the user inputs the instruction to change operation switching setting 46 through operation unit 21, control unit 50 receives the instruction input through operation unit 21 and changes operation switching setting 46 on data storage unit 40 in accordance with the received instruction.

The above description is directed to the changing of operation switching setting 46 that is performed through operation unit 21 and display unit 22. Operation switching setting 46 can also be changed through operation unit 81 and display unit 82 of PC 80 via network 11 by having a program for changing operation switching setting 46 installed into PC 80.

(Changing of Attribute Examination Setting 47)

The next description relates to the operation performed by MFP 20 if attribute examination setting 47 is changed.

When the user inputs an instruction to display a screen for changing attribute examination setting 47 through operation unit 21, control unit 50 displays the screen on display unit 22. Through the GUI displayed on the screen, the user can issue an instruction to change attribute examination setting 47 to any one of the above-mentioned "on" and "off."

When the user inputs the instruction to change attribute examination setting 47 through operation unit 21, control unit 50 receives the instruction input through operation unit 21 and changes attribute examination setting 47 on data storage unit 40 in accordance with the received instruction.

The above description is directed to the changing of attribute examination setting 47 that is performed through operation unit 21 and the display unit 22. Attribute examination setting 47 can also be changed through operation unit 81 and display unit 82 of PC 80 via network 11 by having a program for changing attribute examination setting 47 installed into PC 80.

(Storing of the Print Data in BOX 48)

A description is made of the operation performed by MFP 20 if the print data is stored in BOX 48.

When transmitting the print data from PC 80 to MFP 20 through the program such as printer driver 84a, the user can issue an instruction to store the print data in BOX 48 of data storage unit 40 from PC 80 to MFP 20.

When receiving the print data and the instruction to store the print data in BOX 48 via network communication unit 32, control unit 50 stores the received print data in BOX 48. In this case, when receiving authentication information such as an ID and a password of the user from PC 80 along with the print data, control unit 50 stores the print data and the authentication information in BOX 48 in association with each other.

(Printer Printing)

The next description relates to printing operation performed by MFP 20 based on the print data received from an external device, such as PC 80 via network communication unit 32.

When transmitting the print data from PC 80 to MFP 20 through the program such as printer driver 84a, the user can issue an instruction to perform printing based on the print data from PC 80 to MFP 20.

Figure 7:
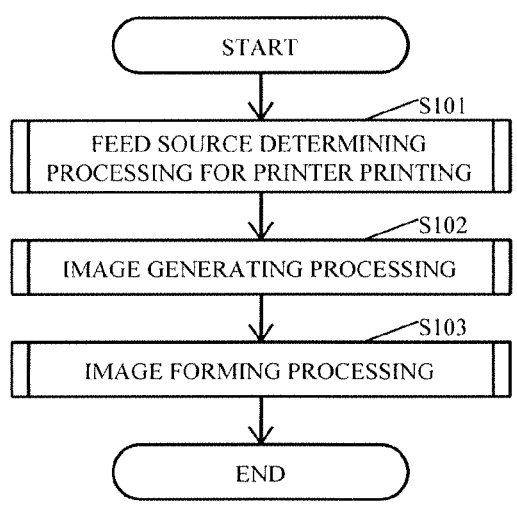
FIG. 7 shows a flow diagram of printer processing, according to an embodiment of the present disclosure.

Control unit 50 executes processing illustrated in FIG. 7 when receiving the print data and the instruction to perform the printing based on the print data via network communication unit 32 by print data receiving unit 56.

FIG. 7 shows a flow diagram of printer processing, according to an embodiment of the present disclosure. FIG. 7 shows a flow of printer processing performed by an MFP.

As illustrated in FIG. 7, the printing control unit of the MFP executes processing for determining the feed source. This processing determines the feed source of the recording medium (S101) and allows for printing operations.

Figure 8:
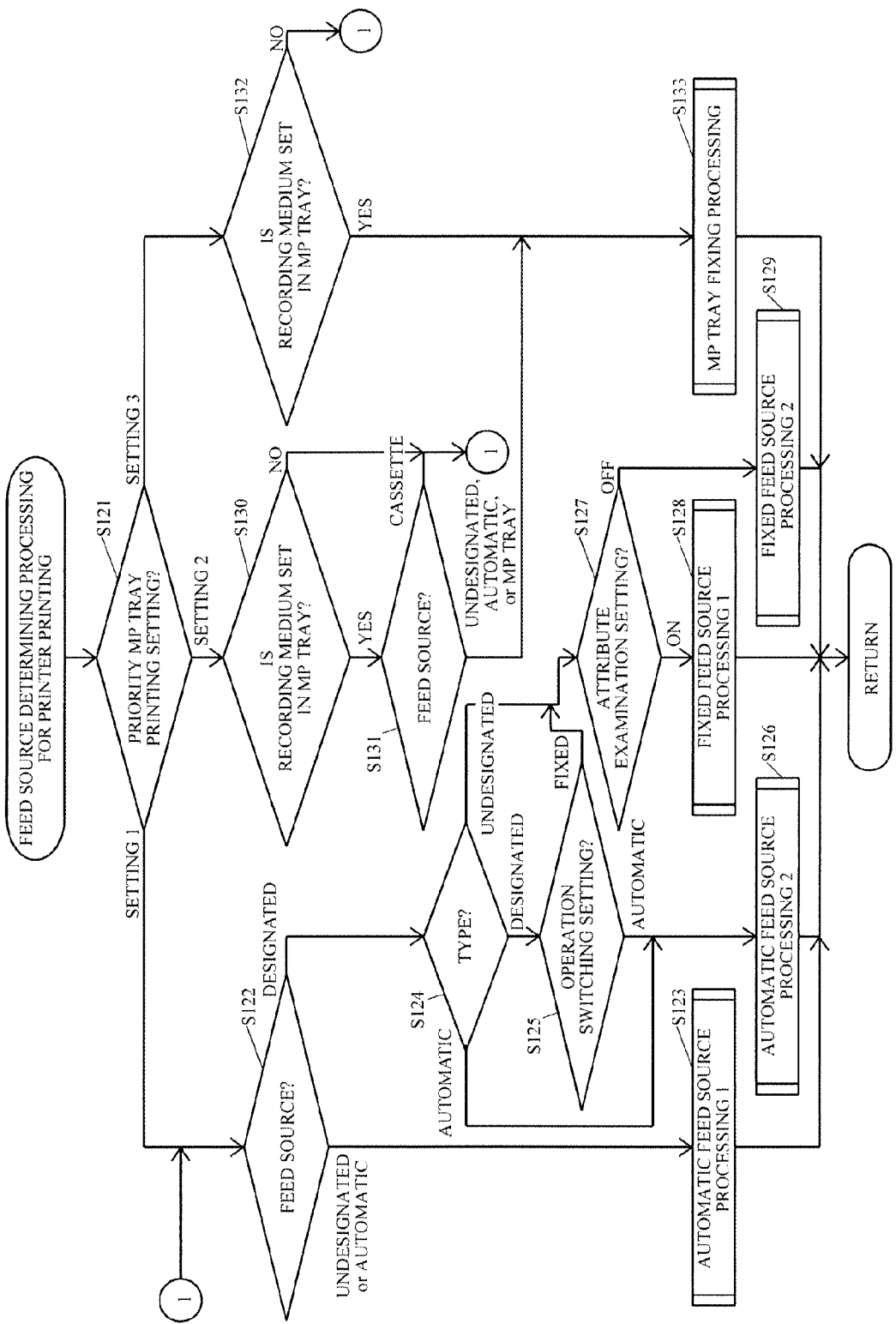
FIG. 8 shows a flow diagram of feed source determining processing for printer printing, according to an embodiment of the present disclosure.

FIG. 8 shows a flow diagram of feed source determining processing for printing, according to an embodiment of the present disclosure. FIG. 8 shows a flow of the feed source determining processing for printing that is performed by the MFP.

As illustrated in FIG. 8, the printing control unit of the MFP verifies a priority MP tray printing setting (S121).

When determining in Step S121 that the priority MP tray printing setting is "Setting 1," the printing control unit verifies the designated feed source (S122).

When determining in Step S122 that there is no designated feed source in the print data or that the designated feed source is "automatic," the printing control unit executes automatic feed source processing 1 (S123).

Figure 9:
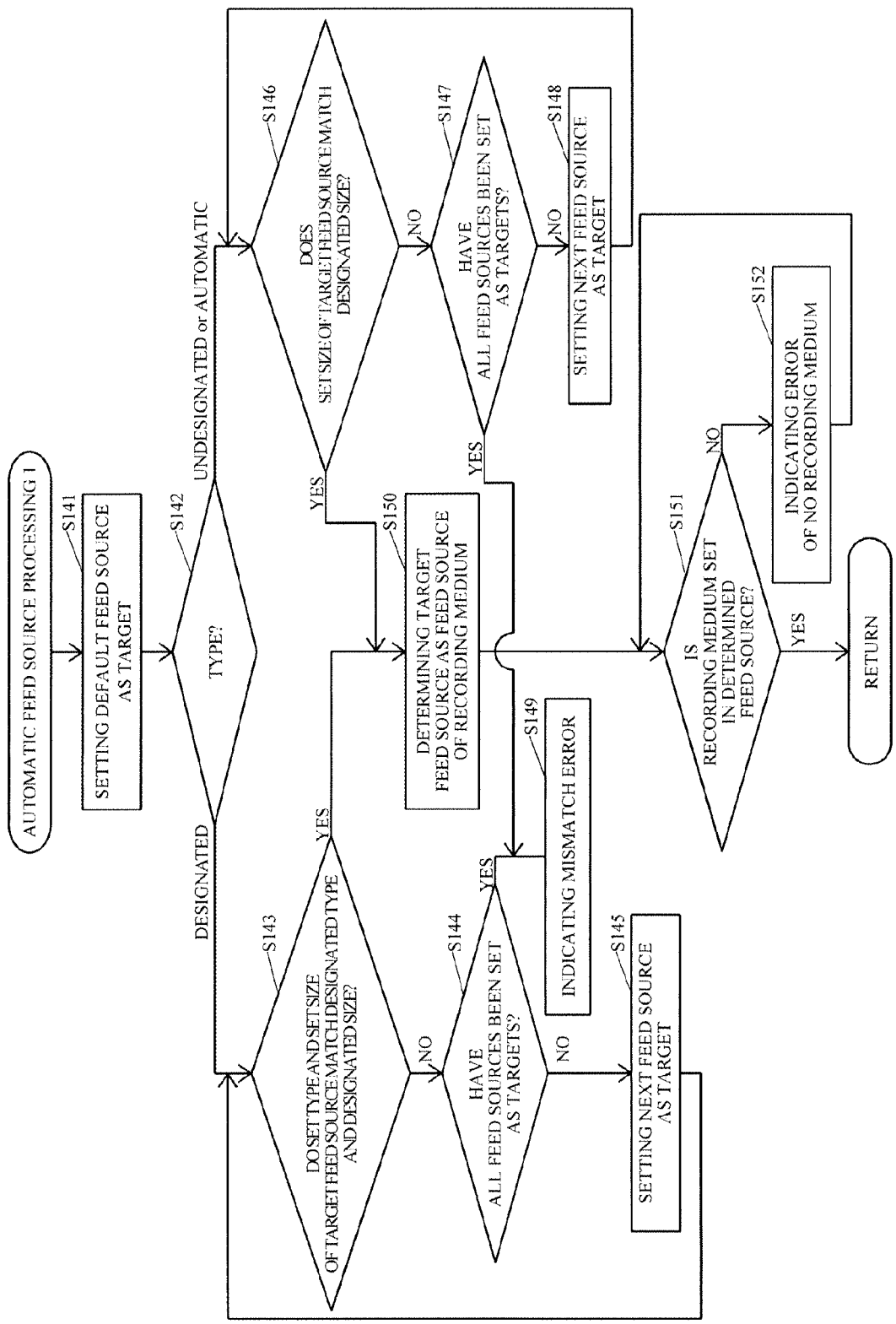
FIG. 9 shows a flow diagram of automatic feed source processing 1, according to an embodiment of the present disclosure.

FIG. 9 shows a flow diagram of automatic feed source processing 1, according to an embodiment of the present disclosure.

FIG. 9 shows a flow of the automatic feed source processing 1 performed by the MFP.

As illustrated in FIG. 9, the printing control unit of the MFP first sets the default feed source as a target (S141).

Subsequently, the printing control unit verifies the designated type of the recording medium (S142).

When determining that there is a designated type, the printing control unit determines if the set type and the set size of the target feed source match the designated type and the designated size (S143).

When determining that the set type and the set size of the target feed source do not match the designated type and the designated size, respectively, the printing control unit determines if all the feed sources have been set as targets (S144).

If all the feed sources have not been set as targets, the printing control unit sets the next feed source as the target based on a predetermined order (S145), and executes the processing of Step S143 again.

When determining in Step S142 that there is no designated type or that the designated type is an automatic setting, the printing control unit determines if the set size of the target feed source matches the designated size (S146).

When determining that the set size of the target feed source does not match the designated size, the printing control unit determines if all the feed sources have been set as the targets (S147).

If the feed source has not been set as the target, the printing control unit sets the next feed source as the target based on a predetermined order (S148), and executes the processing of Step S146 again.

When determining in Step S144 or S147 that all the feed sources have been set as the targets, the printing control unit displays an error indicating that there is a mismatch in the attribute of the recording medium. In some instances, this error may be provided on a display unit of the MFP (S149). When the error is displayed, the user can instruct the MFP to print on the recording medium by executing a specific operation on the MFP. The printing control unit may stop printing until the user executes the specific operation. It should be noted that in this embodiment, for illustrative purposes, FIG. 9 does not show processing subsequent to Step S149.

In Step S143, it may be determined that the set type and the set size of the target feed source match the designated type and the designated size, respectively. In Step S146, it may be determined that the set size of the target feed source matches the designated size. As such, the printing control unit may determine the target feed source as the feed source of the recording medium (S150).

Subsequently, the printing control unit may determine whether the recording medium is set in the determined feed source (hereinafter referred to as "determined feed source") based on an output from the cassette medium sensors or the manually-fed medium sensor (S151).

Upon determining that the recording medium is not set in the determined feed source, the printing control unit displays an error indicating that the recording medium is not set in the determined feed source (S152). Subsequently, the printing control unit executes the processing of Step S151 again.

In Step S151, when determining that the recording medium is set in the determined feed source, the printing control unit ends automatic feed source processing 1 illustrated in FIG. 9.

As illustrated in FIG. 8, when determining in Step S122 that there is a designated feed source, in other words, any one of the plurality of sheet feeding cassettes and the MP tray is designated in the print data, the printing control unit of the MFP verifies the designated type of the recording medium (S124).

When determining that there is a designated type in the print data, the printing control unit verifies an operation switching setting (S125).

In Step S124, it may be determined that the designated type is the automatic setting or as in Step S125, that the operation switching setting is "automatic." In both cases, the printing control unit executes automatic feed source processing 2 (S126).

Figure 10:
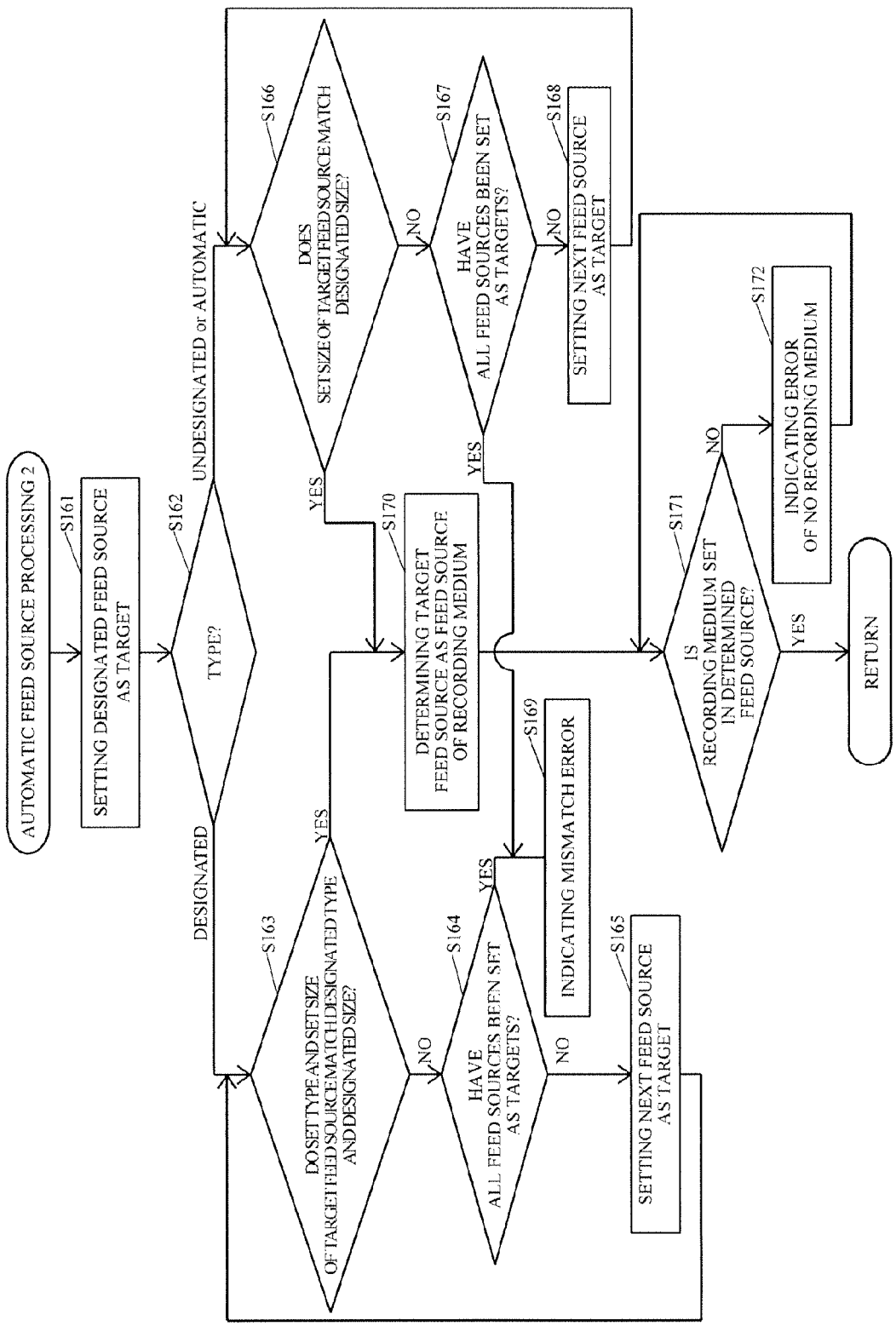
FIG. 10 shows a flow diagram of automatic feed source processing 2, according to an embodiment of the present disclosure.

FIG. 10 shows a flow of automatic feed source processing 2 performed by the MFP.

As illustrated in FIG. 10, the printing control unit of the MFP first sets the designated feed source as a target (S161).

The processing of Steps S162 to S172 of the automatic feed source processing 2 illustrated in FIG. 10 may be the same as the processing of Steps S142 to S152 of the automatic feed source processing 1 illustrated in FIG. 9.

As illustrated in FIG. 8, when determining in Step S124 that there is no designated type in the print data or when determining in Step S125 that the operation switching setting is "fixed," the printing control unit of the MFP verifies an attribute examination setting (S127).

When determining that the attribute examination setting is "on," the printing control unit executes fixed feed source processing 1 (S128).

Figure 11:
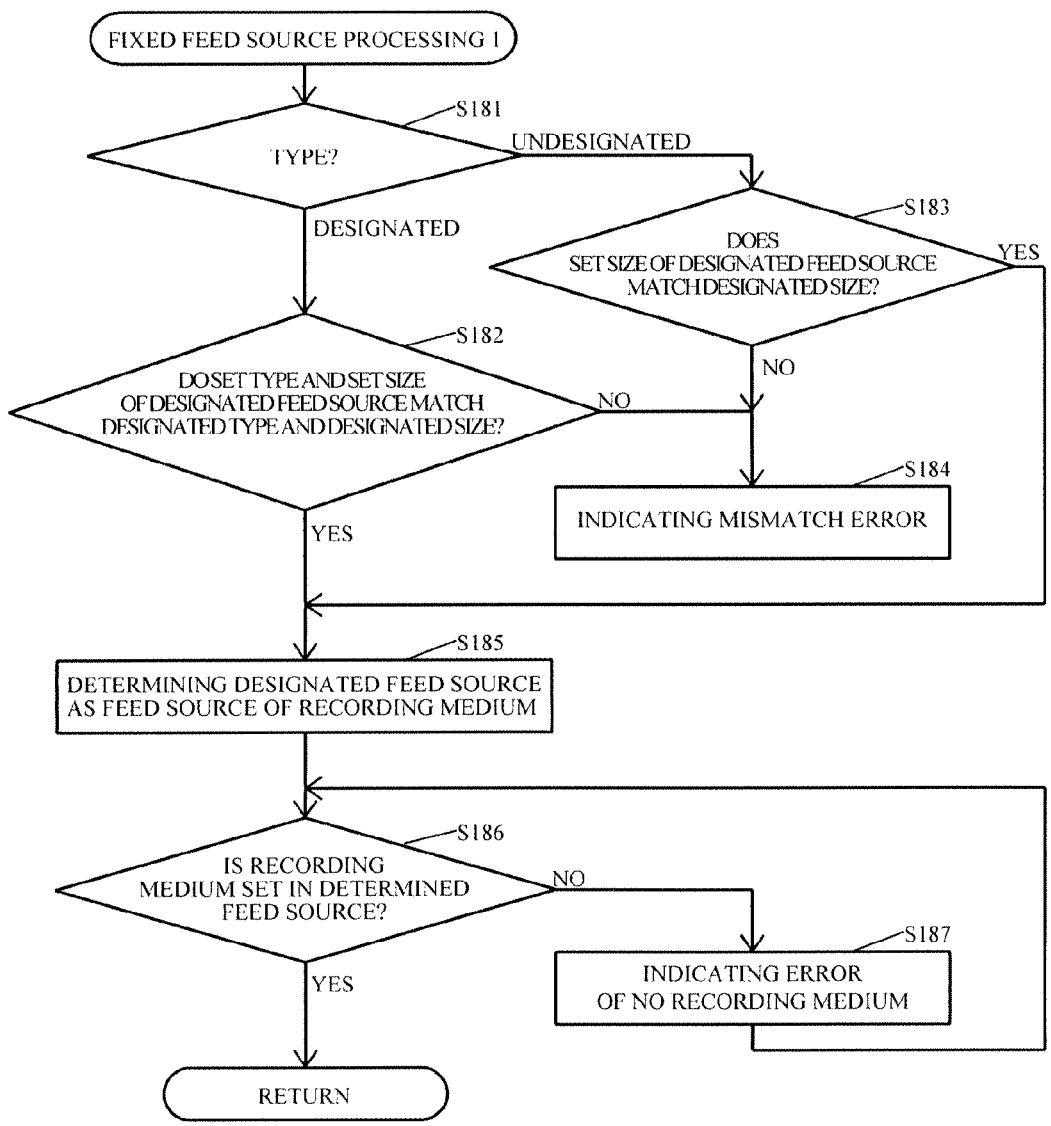
FIG. 11 shows a flow diagram of fixed feed source processing 1, according to an embodiment of the present disclosure.

FIG. 11 shows a flow of fixed feed source processing 1 performed by the MFP.

As illustrated in FIG. 11, the printing control unit of the MFP verifies the designated type of the recording medium (S181).

When determining that there is a designated type, the printing control unit determines if the set type and the set size of the designated feed source match the designated type and the designated size (S182).

When determining that there is no designated type in Step S181, the printing control unit determines if the set size of the designated feed source matches the designated size (S183).

In Step S182, it may be determined that the set type and the set size of the designated feed source do not match the designated type and the designated size, respectively. Alternatively, in Step S183, it may be determined that the set size of the designated feed source does not match the designated size. In either case, the printing control unit displays the error indicating that there is a mismatch in the attribute of the recording medium on the display unit (S184). In such instances, the user can cause the MFP to perform the printing on the recording medium by executing the specific operation on the MFP. The printing control unit stops the printing processing until the user executes the specific operation. In this embodiment, a description of the processing subsequent to Step S184 is omitted.

In Step S182, it may be determined that the set type and the set size of the designated feed source match the designated type and the designated size, respectively. Alternatively, in Step S183, it may be determined that the set size of the designated feed source matches the designated size. In either case, the printing control unit determines the designated feed source as the feed source of the recording medium (S185).

Subsequently, the printing control unit may determine that the recording medium is set in the determined feed source based on the output from the cassette medium sensors or a manually-fed medium sensor (S186).

When determining that the recording medium is not set in the determined feed source, the printing control unit displays the error indicating that the recording medium is not set in the determined feed source (S187). Subsequently, the printing control unit executes the processing of Step S186 again.

In Step S186, when determining that the recording medium is set in the determined feed source, the printing control unit ends the fixed feed source processing 1 illustrated in FIG. 11.

As illustrated in FIG. 8, when determining in Step S127 that the attribute examination setting is "off," the printing control unit executes fixed feed source processing 2 (S129).

Figure 12:
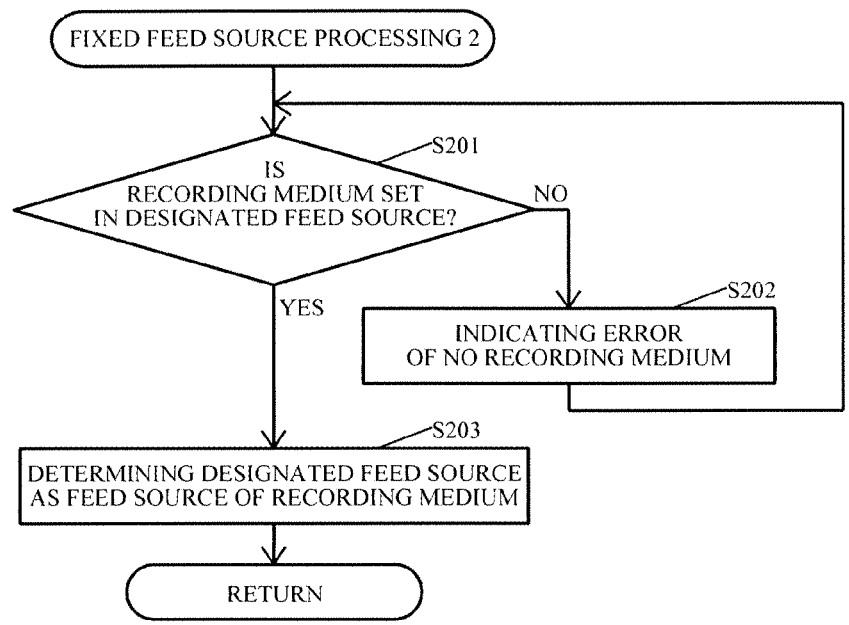
FIG. 12 shows a flow diagram of fixed feed source processing 2, according to an embodiment of the present disclosure.

FIG. 12 shows a flow of fixed feed source processing 2 performed by the MFP.

As illustrated in FIG. 12, the printing control unit of the MFP determines if the recording medium is set in the designated feed source based on the output from the cassette medium sensors or the manually-fed medium sensor (S201).

When determining that the recording medium is not set in the designated feed source, the printing control unit displays an error indicating that the recording medium is not set in the designated feed source on the display unit (S202). Subsequently, the printing control unit executes the processing of Step S201 again.

When determining in Step S201 that the recording medium is set in the designated feed source, the printing control unit determines the designated feed source as the feed source of the recording medium (S203), and ends the fixed feed source processing 2 illustrated in FIG. 12.

As illustrated in FIG. 8, when determining in Step S121 that the priority MP tray printing setting is "Setting 2," the printing control unit 52 of the MFP determines if the manually-fed medium sensor has detected that the recording medium is set in the MP tray (S130).

When determining that it has been detected that the recording medium is set in the MP tray, the printing control unit verifies the designated feed source (S131).

When determining in Step S121 that the priority MP tray printing setting is "Setting 3," the printing control unit determines if the manually-fed medium sensor has detected that the recording medium is set in the MP tray (S132).

When determining in Step S130 or S132 that the recording medium is set in the MP tray or when determining in Step S131 that the designated feed source is other than the "MP tray," the printing control unit executes the processing of Step S122. In other words, when anyone of the plurality of sheet feeding cassettes are designated in the print data, the printing control unit executes the processing of Step S122.

In Step S131, it may be determined that there is no designated feed source. Yet, it may be determined that the designated feed source is "automatic" or the "MP tray" (with the designated feed source being "automatic" or the default being the MP tray). Alternatively, in Step S132, it may be determined that the manually-fed medium sensor has detected that the recording medium is set in the MP tray. If one or more of the conditions described above are met, the printing control unit executes MP tray fixing processing illustrated in FIG. 13 (S133).

Figure 13:
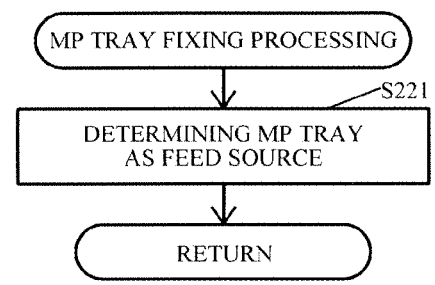
FIG. 13 shows a flow diagram of MP tray fixing processing, according to an embodiment of the present disclosure.

FIG. 13 shows a flow of the MP tray fixing processing performed by the MFP.

As illustrated in FIG. 13, the printing control unit of the MFP determines the MP tray as the feed source of the recording medium (S221), and ends the MP tray fixing processing illustrated in FIG. 13.

As illustrated in FIG. 8, after the processing of Step S123, S126, S128, S129, or S133, the printing control unit 52 of the MFP ends the feed source determining processing for printing illustrated in FIG. 8.

Figure 14:
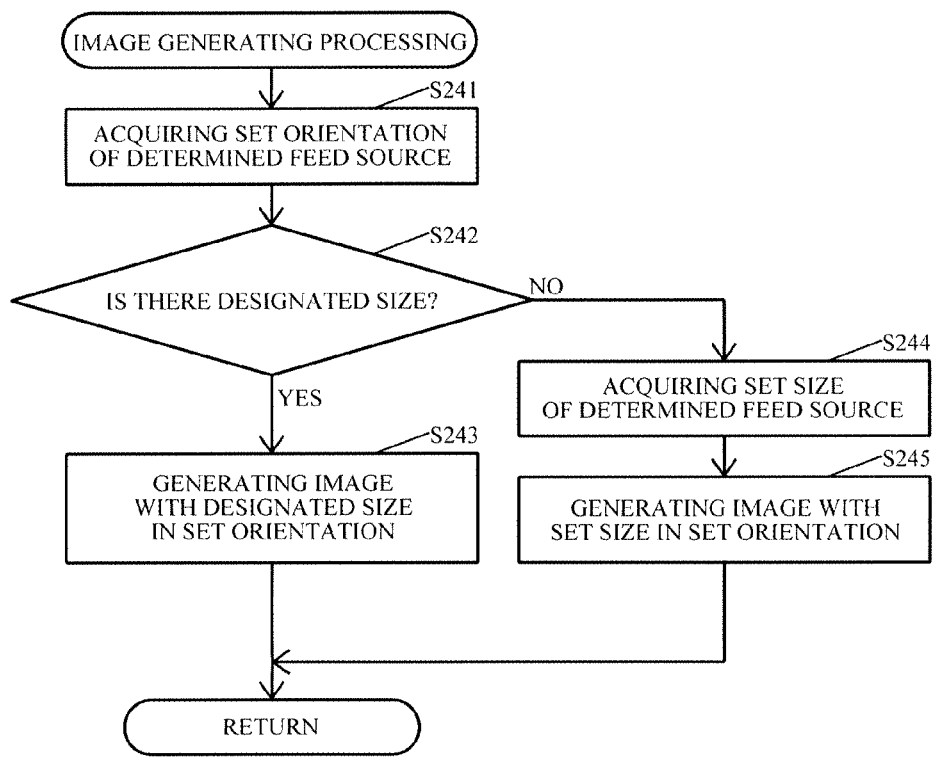
FIG. 14 shows a flow diagram of image generating processing, according to an embodiment of the present disclosure.

As illustrated in FIG. 7, when the feed source determining processing for printing of Step S101 has been completed, an image generating unit of a control unit of the MFP executes image generating processing and generates an image based on the print data as illustrated in FIG. 14 (S102).

FIG. 14 shows a flow of the image generating processing performed by the MFP.

As illustrated in FIG. 14, the image generating unit of the MFP acquires the set orientation of the determined feed source (S241).

Subsequently, the image generating unit determines if there is a designated size (S242).

When determining in Step S242 that there is a designated size, the image generating unit generates the image based on the print data with the designated size in the set orientation acquired in Step S241 (S243).

When determining in Step S242 that there is no designated size, the image generating unit acquires the set size of the determined feed source (S244).

Subsequently, the image generating unit generates the image based on the print data with the size acquired in Step S244 in the set orientation acquired in Step S241 (S245).

After Step S243 or S245, the image generating unit ends the image generating processing illustrated in FIG. 14.

Figure 15:
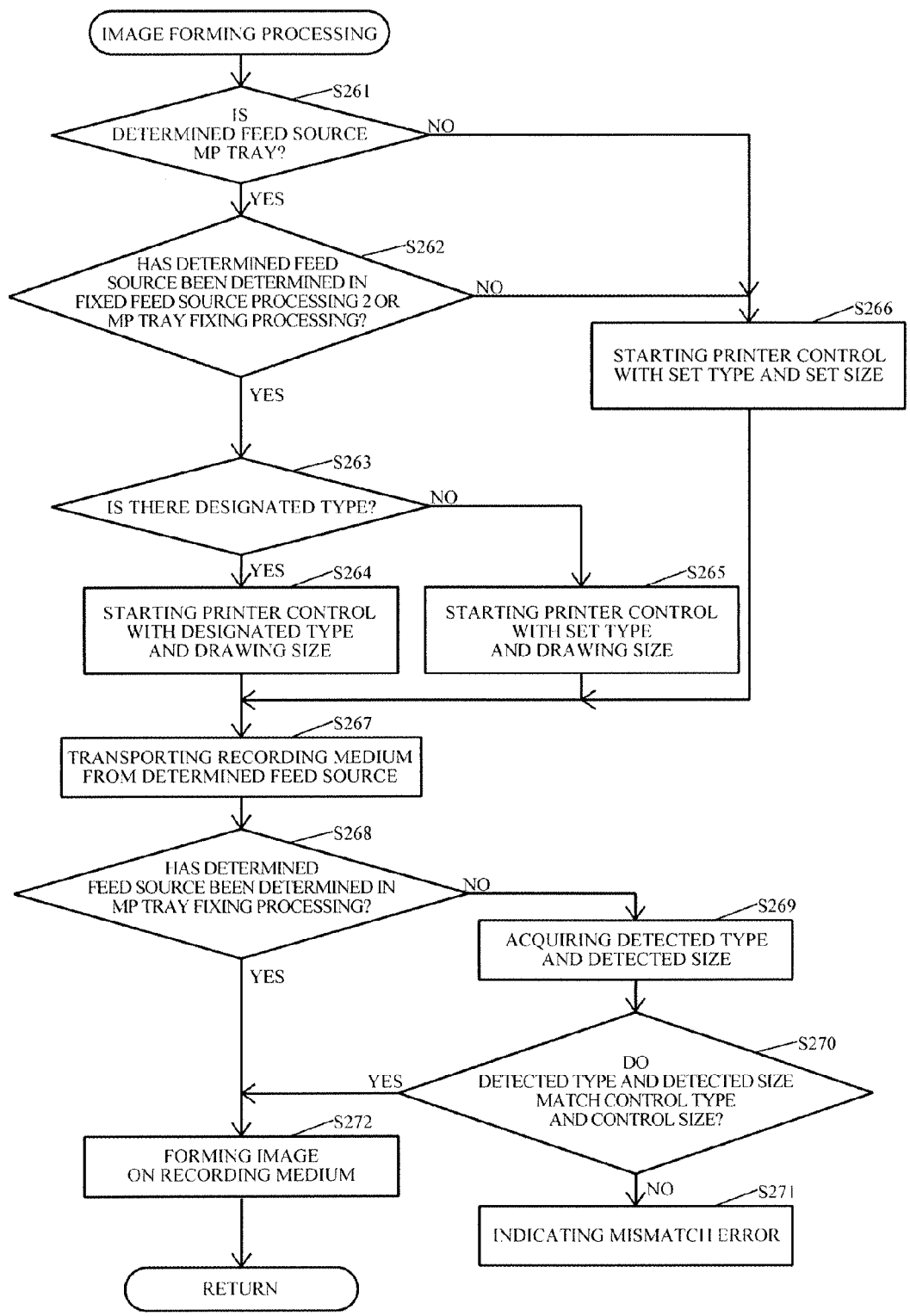
FIG. 15 shows a flow diagram of image forming processing, according to an embodiment of the present disclosure.

As illustrated in FIG. 7, when the image generating processing of Step S102 ends, the printing control unit 52 of the MFP executes image forming processing that forms the image generated in Step S102 on the recording medium as illustrated in FIG. 15 (S103).

FIG. 15 shows a flow of the image forming processing performed by the MFP.

As illustrated in FIG. 15, the printing control unit of the MFP determines if the determined feed source is the MP tray (S261).

When determining in Step S261 that the determined feed source is the MP tray, the printing control unit determines if the determined feed source has been determined in fixed feed source processing 2 or the MP tray fixing processing (S262).

When determining in Step S262 that the determined feed source has been determined in fixed feed source processing 2 or the MP tray fixing processing, the printing control unit determines if there is a designated type (S263).

In Step S263, when determining that there is a designated type, the printing control unit starts controlling the printer with the designated type and the size of the image (hereinafter referred to as "drawing size") generated in the image generating processing (S264).

In Step S263, when determining that there is no designated type, the printing control unit starts controlling the printer with the set type of the determined feed source and the drawing size (S265).

In Step S261, when determining that the determined feed source is not the MP tray or when determining in Step S262 that the determined feed source has been determined in processing other than the fixed feed source processing 2 or the MP tray fixing processing, the printing control unit starts controlling the printer with the set type and the set size of the determined feed source (S266).

After Step S264, S265, or S266, the printing control unit transports the recording medium from the determined feed source by the printer (S267).

Subsequently, the printing control unit determines if the determined feed source has been determined in the MP tray fixing processing (S268).

In Step S268, when determining that the determined feed source has been determined in processing other than the MP tray fixing processing, the printing control unit acquires the type of recording medium detected by the attribute sensor. In particular, the printing control unit acquires the detected type and the size of the recording medium detected by the attribute sensor (S269).

Subsequently, the printing control unit determines if the detected type and the detected size match the type of the recording medium used in the control of the printer set in Step S264, S265, or S266. In other words, it is determined whether or not the detected type and the detected size match the control type and the size of the recording medium used in the control of the printer set in Step S264, S265, or S266 (S270).

In Step S270, when determining that there is no match, the printing control unit displays the error indicating that there is a mismatch in the attribute of the recording medium on the display unit (S271). When the error is displayed, the user can cause the MFP to perform the printing on the recording medium by executing the specific operation on the MFP. The printing control unit stops the printing processing until the user executes the specific operation.

In Step S268, when determining that the determined feed source has been determined in the MP tray fixing processing or when determining in Step S270 that there is a match, the printing control unit forms the image generated in the image generating processing on the recording medium being transported (S272).

It should be noted that the printing control unit repeats Steps S267 to S272 for each page when the print data includes the image having a plurality of pages.

Subsequently, the printing control unit ends the image forming processing illustrated in FIG. 15.

As illustrated in FIG. 7, when the image forming processing of Step S103 ends, the printing control unit ends the processing illustrated in FIG. 7.

(BOX Printing)

A description is made of the BOX printing as a printing operation performed by MFP 20 based on the print data stored in BOX 48 illustrated in FIG. 2 and FIG. 3.

The user can instruct MFP 20 to perform the printing based on the print data stored in BOX 48 through operation unit 21. In this case, when a plurality of pieces of the print data are stored in BOX 48, the user can select an arbitrary piece of print data from among the plurality of pieces of the print data stored in BOX 48 and instruct MFP 20 to perform the printing based on the print data through operation unit 21.

Figure 16:
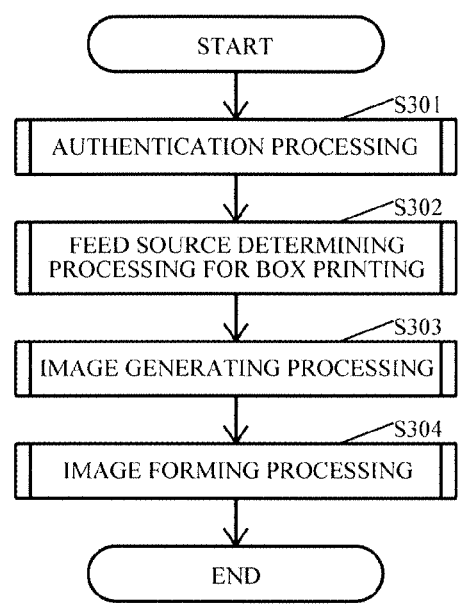
FIG. 16 shows a flow diagram of BOX printing processing, according to an embodiment of the present disclosure.

Control unit 50 executes the processing illustrated in FIG. 16 when receiving the instruction to perform the printing based on the print data stored in BOX 48. In other words, control unit 50 executes the stored data printing instruction by BOX printing instruction receiving unit 57 through operation unit 21.

FIG. 16 shows a flow diagram, according to an embodiment of the present disclosure of BOX printing processing. FIG. 16 shows a flow diagram of BOX printing processing performed by the MFP.

As illustrated in FIG. 16, the control unit of the MFP executes authentication processing (S301).

Figure 17:
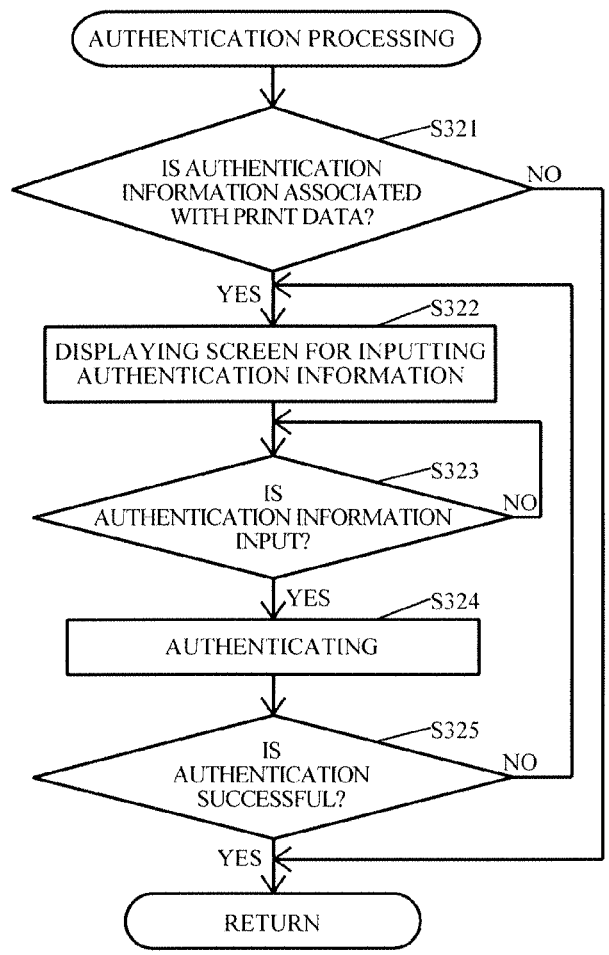
FIG. 17 shows a flow diagram of authentication processing, according to an embodiment of the present disclosure.

FIG. 17 shows a flow diagram of authentication processing, according to an embodiment of the present disclosure. FIG. 17 shows a flow diagram of the authentication processing performed by the MFP.

As illustrated in FIG. 17, the control unit of the MFP determines if the authentication information is associated with the print data in the BOX (S321).

When determining that the authentication information is associated with the print data in the BOX, the control unit displays a screen for inputting the authentication information on the display unit (S322).

Subsequently, the control unit determines if the authentication information is input through the operation unit (S323).

When determining that the authentication information is input through the operation unit, the control unit executes authentication based on the authentication information associated with the print data in the BOX and the authentication information input in Step S323 (S324). In this case, the control unit determines that the authentication is successful if the authentication information associated with the print data in the BOX and the authentication information input in Step S323 match each other. On the other hand, the control unit determines that the authentication has failed if the authentication information associated with the print data in the BOX and the authentication information input in Step S323 do not match each other.

Subsequently, the control unit determines if the authentication is successful (S325).

When determining that the authentication has failed, the control unit executes the processing of Step S322 again.

When determining in Step S321 that the authentication information is not associated with the print data in the BOX or when determining in Step S325 that the authentication is successful, the control unit ends the authentication processing illustrated in FIG. 17.

As illustrated in FIG. 16, after the end of the authentication processing of Step S301, the printing control unit executes feed source determining processing for BOX printing to determine the feed source of the recording medium (S302).

Figure 18:
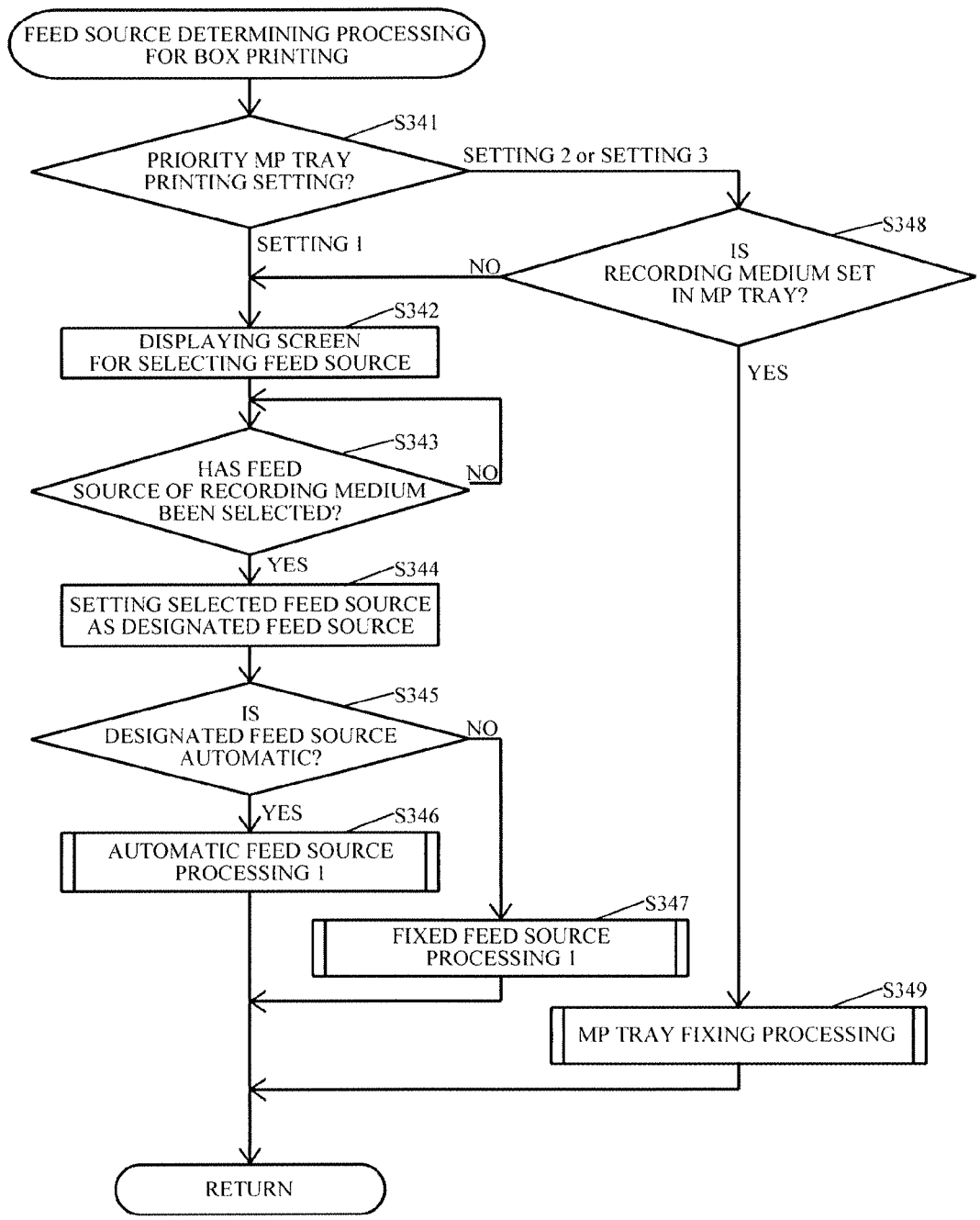
FIG. 18 shows a flow diagram of feed source determining processing for BOX printing, according to an embodiment of the present disclosure.

FIG. 18 shows a flow diagram of feed source determining processing for BOX printing, according to an embodiment of the present disclosure. FIG. 18 shows a flow of the feed source determining processing for BOX printing that is performed by the MFP.

As illustrated in FIG. 18, the printing control unit of the MFP verifies the priority MP tray printing setting (S341).

When determining that the priority MP tray printing setting 42 is "Setting 1," the printing control unit displays a screen for selecting the feed source of the recording medium on the display unit (S342). In this case, the user can select "automatic" or any one of the plurality of sheet feeding cassettes and the MP tray as the feed source of the recording medium.

Subsequently, the printing control unit determines if the feed source of the recording medium has been selected through the operation unit until it is determined that the feed source of the recording medium has been selected through the operation unit (S343).

When determining that the feed source of the recording medium has been selected through the operation unit, the printing control unit sets the selected feed source as the designated feed source of the print data (S344).

Subsequently, the printing control unit determines if the designated feed source is "automatic" (S345).

When determining that the designated feed source is "automatic," the printing control unit executes the automatic feed source processing 1 illustrated in FIG. 9 (S346).

On the other hand, when determining in Step S345 that the designated feed source is not "automatic," the printing control unit executes the fixed feed source processing 1 illustrated in FIG. 11 (S347).

When determining in Step S341 that the priority MP tray printing setting is "Setting 2" or "Setting 3," the printing control unit determines if the manually-fed medium sensor has detected that the recording medium is set in the MP tray (S348).

When determining that the manually-fed medium sensor has not detected that the recording medium is set in the MP tray, the printing control unit executes the processing of Step S342.

On the other hand, when determining that the manually-fed medium sensor has detected that the recording medium is set in the MP tray, the printing control unit executes the MP tray fixing processing illustrated in FIG. 13 (S349).

After Step S346, S347, or S349, the printing control unit ends the feed source determining processing for BOX printing illustrated in FIG. 18.

As illustrated in FIG. 16, after the end of the feed source determining processing for BOX printing of Step S302, the image generating unit of the control unit executes the image generating processing that generates the image based on the print data as illustrated in FIG. 14 (S303).

Subsequently, the printing control unit of the control unit executes the image forming processing that forms the image generated in Step S303 on the recording medium as illustrated in FIG. 15 (S304), and ends the processing illustrated in FIG. 16.

(Copy Printing)

A description is made of copy printing as operation performed by MFP 20 based on the print data generated in accordance with the image read from the original by scanner 30 illustrated in FIG. 1 and FIG. 2.

In the feed source determining processing for the copy printing, only one of automatic feed source processing 1, fixed feed source processing 1, and the MP tray fixingprocessing is executed. In some instances, the feed source determining processing for copy printing may be the same or similar processing as in the feed source determining processing for the BOX printing. Specifically, in the feed source determining processing for the copy printing, the MP tray fixing processing is executed if priority MP tray printing setting 42 is "Setting 2" or "Setting 3" and if manually-fed medium sensor 26 has detected that recording medium 20a is set in MP tray 24. Further, automatic feed source processing 1 is executed if priority MP tray printing setting 42 is "Setting 1," or if the feed source is "automatic" after causing the user to select feed source of recording medium 20a if manually-fed medium sensor 26 has not detected that recording medium 20a is set in MP tray 24, and otherwise, fixed feed source processing 1 is executed.

Automatic feed source processing 1, fixed feed source processing 1, and the MP tray fixing processing are the same as in the case of the printing. However, the designated attribute is included in the print data in the printing, but is included in a command designated by operation unit 21 through MFP 20 in the copy printing.

(FAX Printing)

A description is made of the FAX printing as operation performed by MFP 20 based on the print data generated in accordance with FAX data received by MFP 20 illustrated in FIG. 1 and FIG. 2 from an external facsimile device through FAX communication unit 31.

In the feed source determining processing for the FAX printing, only automatic feed source processing 1 is executed.

Automatic feed source processing 1 is the same as in the case of the printing. However, the designated attribute is included in the print data in the printing, but is also included in the FAX data in the FAX printing.

As described above, executing a manual feed forcing operation forces the recording medium to be fed from the MP tray to the printer (i.e., the MP tray fixing processing). As the image forming apparatus, the MFP may determine an orientation of the image based on the set orientation. Accordingly, it is possible to suppress an occurrence of a failure in printing ascribable to the orientation of the recording medium.

Further, independent of receiving print data or a time in receiving the print data, the MFP may cause the orientation setting unit to receive the instruction for the orientation of the recording medium and set the orientation accordingly. In this case, it is possible to reduce the operations executed by the user after the recording medium is set in the MP tray until the printing control unit executes the MP tray fixing processing. Therefore, the MFP can improve convenience of the user when executing the MP tray fixing processing.

Further, when executing the MP tray fixing processing, the MFP may determine the orientation of the image based on the set orientation before feeding the recording medium to the printer. In this case, it is not necessary to rotate the generated image after the recording medium is fed to the printer. Therefore, it suffices that the MFP does not include a rotation circuit for a bitmap image.

Further, when executing the MP tray fixing processing, the MFP may continue the printing processing without displaying the error even if the designated attribute does not match the set attribute. In this case, the user is not requested to perform the changing to the recording medium having an appropriate attribute or other such operation. Therefore, the MFP can improve the convenience of the user when executing the MP tray fixing processing.

Further, when executing the MP tray fixing processing, the MFP may continue the printing processing without displaying the error even if the detected attribute does not match the control attribute. In this case, the user is not requested to perform the changing to the recording medium having an appropriate attribute or other such operation. Therefore, the MFP can improve the convenience of the user when executing the MP tray fixing processing.

In the case where the user has designated the MP tray at the time of the printing, the user may intend to perform the printing on the recording medium set in the MP tray irrespective of an image size. Accordingly, when executing the MP tray fixing processing, the MFP may continue the printing even if the designated size does not match the set size. Further, when executing the MP tray fixing processing, the MFP may continue the printing even if the detected size does not match the control size. Further, when executing the MP tray fixing processing, if there is a designated attribute, the MFP may execute the printing based on the designated attribute instead of the set attribute. Accordingly, it is possible to improve the convenience of the user when executing the MP tray fixing processing.

Further, the MFP may execute the MP tray fixing processing when the manually-fed medium sensor has detected that the recording medium is set in the MP tray and if the placement of a higher priority on the MP tray than the sheet feeding cassette is set in the priority MP tray printing setting. In this case, the MFP can allow the user to use the priority MP tray printing setting to select whether or not to execute the MP tray fixing processing when the recording medium is set in the MP tray.

The network system includes a PC as the external device of the MFP, but may include a device other than the PC as the external device of the MFP.

The image forming apparatus according to the present disclosure is the MFP in this embodiment, but may be an image forming apparatus other than the MFP such as a standalone printer, a standalone machine, or a standalone copier.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
    a medium storage unit configured to store a recording medium;
    a manual medium feeding unit configured to have the recording medium set for manual feed;
    a manual feed detecting unit configured to detect if the recording medium is set in the manual medium feeding unit;
    a printing device configured to print an image on the recording medium fed from either the medium storage unit or the manual medium feeding unit;
    a print data receiving unit configured to receive print data;
    a medium orientation setting unit configured to: (1) receive a first instruction for an orientation of the recording medium to be fed from the manual medium feeding unit to the printing device, and based at least on the first instruction, (2) set the orientation of the recording medium;
    a printing control unit configured to:
        control the printing device to print the image based on the print data on the recording medium; and
        execute a manual feed forcing operation that forces the recording medium to be fed from the manual medium feeding unit to the printing device if the manual feed detecting unit has detected that the recording medium is set in the manual medium feeding unit;
    an image generating unit configured to:
        generate the image based on the print data; and
        determine an orientation of the image based on the orientation of the recording medium; and
    a priority manual feed setting unit configured to receive a second instruction for a priority manual feed, wherein the second instruction indicates placing a higher priority on the manual medium feeding unit than the medium storage unit and sets the priority manual feed, and wherein if the recording medium is set in the manual medium feeding unit, the printing control unit is further configured to execute the manual feed forcing operation.

2. The image forming apparatus according to claim 1, further comprising a manual feed attribute setting unit configured to: (a) receive a third instruction for a first attribute of the recording medium corresponding to the manual medium feeding unit and (b) set the first attribute, wherein the printing control unit is further configured to continue the printing while executing the manual feed forcing operation even if the first attribute of the recording medium does not match a second attribute of the recording medium included in the print data.

3. The image forming apparatus according to claim 2, wherein the first attribute of the recording medium includes a size of the recording medium.

4. The image forming apparatus according to claim 1, further comprising a medium attribute detecting unit configured to detect a first attribute of the recording medium fed to the printing device, wherein the printing control unit is further configured to continue the printing while executing the manual feed forcing operation even if the first attribute does not match a second attribute of the recording medium used in controlling the printing device.

5. The image forming apparatus according to claim 4, wherein the first attribute of the recording medium includes a size of the recording medium.

6. The image forming apparatus according to claim 1, wherein if the recording medium is set in the manual medium feeding unit and the priority manual feed setting unit receives the second instruction, the printing control unit is further configured to execute the manual feed forcing operation.

7. A non-transitory computer-readable recording medium having stored thereon an image forming program executed by a computer of an image forming apparatus, the image forming program comprising:
- a first program code for causing the computer to detect if a recording medium is set in a manual medium feeding unit, wherein the recording medium is set for manual feed;
- a second program code for causing the computer to receive print data;
- a third program code for causing the computer to: (1) receive a first instruction for an orientation of the recording medium to be fed from the manual medium feeding unit to a printing device, and based at least on the first instruction, (2) set the orientation of the recording medium;
- a fourth program code for causing the computer to:
  - based at least on the print data, control the printing device to print an image on the recording medium fed from either a medium storage unit that stores the recording medium or the manual medium feeding unit; and
  - execute a manual feed forcing operation that forces the recording medium to be fed from the manual medium feeding unit to the printing device if a manual feed detecting unit has detected that the recording medium is set in the manual medium feeding unit; and
- a fifth program code for causing the computer to:
  - generate the image based on the print data; and
  - determine an orientation of the image based on the orientation of the recording medium, wherein the computer is further configured to receive a second instruction for a priority manual feed, wherein the second instruction indicates placing a higher priority on a manual medium feeding unit than the medium storage unit, and wherein if a priority manual feed is set and the recording medium is set in the manual medium feeding unit, the computer is further configured to execute the manual feed forcing operation.

8. The non-transitory computer-readable recording medium according to claim 7, wherein the computer receives a third instruction for a first attribute of the recording medium and sets the first attribute, and wherein the computer is further configured to continue printing while executing the manual feed forcing operation even if the first attribute does not match a second attribute of the recording medium included in the print data.

9. The non-transitory computer-readable recording medium according to claim 8, wherein the first attribute of the recording medium includes a size of the recording medium.

10. The non-transitory computer-readable recording medium according to claim 7, wherein (1) if a priority manual feed is set, (2) the recording medium is set in the manual medium feeding unit, and (3) the computer receives the second instruction, the computer is further configured to execute the manual feed forcing operation.

11. An image forming apparatus, comprising:
- a medium storage unit configured to store a recording medium;
- a manual medium feeding unit configured to have the recording medium set for manual feed;
- a manual feed detecting unit configured to detect if the recording medium is set in the manual medium feeding unit;
- a manual feed attribute setting unit configured to: (1) receive a first instruction for a first attribute of the recording medium corresponding to the manual medium feeding unit and (2) set the first attribute;
- a printing device configured to print an image on the recording medium fed from either the medium storage unit or the manual medium feeding unit;
- a print data storage unit configured to store print data;
- a stored data printing instruction receiving unit configured to receive a stored data printing instruction for printing based on the print data stored in the print data storage unit;
- a printing control unit configured to:
  - control the printing device to print the image based on the print data on the recording medium;
  - if the stored data printing instruction is received by the stored data printing instruction receiving unit and the manual feed detecting unit has detected that the recording medium is set in the manual medium feeding unit, execute a manual feed forcing operation forces the recording medium to be fed from the manual medium feeding unit to the printing device; and
  - continue the printing while executing the manual feed forcing operation even if the first attribute of the recording medium does not match a second attribute of the recording medium included in the print data; and
- a priority manual feed setting unit configured to receive a second instruction for a priority manual feed, wherein the second instruction indicates placing a higher priority on the manual medium feeding unit than the medium storage unit and sets the priority manual feed, and wherein if (1) the stored data printing instruction is received, (2) the recording medium is set, and (3) the priority manual feed is set, the printing control unit is further configured to execute the manual feed forcing operation.

12. The image forming apparatus according to claim 11, further comprising a medium attribute detecting unit configured to detect a third attribute of the recording medium fed to the printing device, wherein the printing control unit is further configured to continue the printing while executing the manual feed forcing operation even if the third attribute of the recording medium does not match the second attribute of the recording medium included in the print data.

13. The image forming apparatus according to claim 11, wherein the printing control unit is further configured to control the printing device while executing the manual feed forcing operation, and wherein controlling the printing device is based on the second attribute included in the print data, and wherein the print data also includes the first attribute.

14. The image forming apparatus according to claim 11, wherein the first attribute of the recording medium includes a size of the recording medium.

15. The image forming apparatus according to claim 11, further comprising a medium orientation setting unit configured to: (1) receive a third instruction for an orientation of the recording medium to be fed from the manual medium feeding unit to the printing device and (2) based at least on the third instruction, set the orientation, wherein the image forming apparatus is configured to:
  generate the image based on the print data; and
  determine an orientation of the image based on the orientation of the recording medium.

16. A non-transitory computer-readable recording medium having stored thereon an image forming program executed by a computer of an image forming apparatus, the image forming program comprising:
  a first program code for causing the computer to detect if a recording medium is set in a manual medium feeding unit, wherein the recording medium is set for manual feed;
  a second program code for causing the computer to: (1) receive a first instruction for a first attribute of the recording medium corresponding to the manual medium feeding unit and (2) set the first attribute;
  a third program code for causing the computer to store print data in a storage unit;
  a fourth program code for causing the computer to receive a stored data printing instruction for printing based on the print data; and
  a fifth program code for causing the computer to:
    control a printing device to print an image based on the print data on the recording medium fed from either a medium storage unit or the manual medium feeding unit;
    if the stored data printing instruction is received and the recording medium is set in the manual medium feeding unit, execute a manual feed forcing operation that forces the recording medium to be fed from the manual medium feeding unit to the printing device;
    continue the printing while executing the manual feed forcing operation even if the first attribute of the recording medium does not match a second attribute of the recording medium included in the print data; and
  a sixth program code for causing the computer to receive a second instruction for a priority manual feed, wherein the second instruction indicates placing a higher priority on the manual medium feeding unit than the medium storage unit and sets the priority manual feed, and wherein if (1) the stored data printing instruction is received, (2) the recording medium is set, and (3) the priority manual feed is set, the sixth program code further causes the computer to execute the manual feed forcing operation.

17. The non-transitory computer-readable recording medium according to claim 16, wherein the first attribute of the recording medium includes a size of the recording medium.

18. The non-transitory computer-readable recording medium according to claim 16, further comprising a seventh program code for causing the computer to detect a third attribute of the recording medium, wherein the computer is further configured to continue the printing while executing the manual feed forcing operation even if the third attribute does not match the second attribute of the recording medium included in the print data.

19. The non-transitory computer-readable recording medium according to claim 18, wherein the third attribute of the recording medium includes a size of the recording medium.

20. The image forming apparatus according to claim 1, wherein the image generating unit is further configured to:
  generate, if there is a designated size in the print data, the orientation of the image based on the print data with the designated size, while executing the manual feed forcing operation; and
  generate, if there is no designated size in the print data, the orientation of the image based on the print data with a set size of the manual medium feeding unit, while executing the manual feed forcing operation.

21. The image forming apparatus according to claim 11, wherein the image generating unit is further configured to:
  generate, if there is a designated size in the print data, the orientation of the image based on the print data with the designated size, while executing the manual feed forcing operation, and
  generate, if there is no designated size in the print data, the orientation of the image based on the print data with a set size of the manual medium feeding unit, while executing the manual feed forcing operation.

* * * * *